United States Patent [19]

Agrawal

[11] 4,025,594
[45] May 24, 1977

[54] METHOD FOR PRODUCTION OF HOLLOW ARTICLES FROM INJECTION MOLDED PREFORMS

[75] Inventor: Purushottam D. Agrawal, Bloomfield, Conn.

[73] Assignee: Monsanto Company, St. Louis, Mo.

[22] Filed: Sept. 23, 1975

[21] Appl. No.: 615,998

[52] U.S. Cl. .................. 264/97; 264/235; 264/346; 264/DIG. 64; 264/DIG. 65; 432/122
[51] Int. Cl.² .................. B29C 17/07; B29C 25/00
[58] Field of Search .................. 264/25, 94, 97, 99, 264/235, 346, DIG. 64, DIG. 65; 432/122

[56] References Cited

UNITED STATES PATENTS

| | | | |
|---|---|---|---|
| 2,373,093 | 4/1945 | Baker | 264/235 |
| 2,896,264 | 7/1959 | Natta et al. | 264/DIG. 64 |
| 3,294,883 | 12/1966 | Polka | 264/97 |
| 3,477,700 | 11/1969 | Kinslow, Jr. | 263/8 |
| 3,531,452 | 9/1970 | Griffith et al. | 264/235 |
| 3,555,135 | 1/1971 | Paul | 264/235 |
| 3,830,893 | 8/1974 | Steingiser | 264/97 |
| 3,862,288 | 1/1975 | Cheh-Jen Su | 264/235 |
| 3,865,912 | 2/1975 | Rosenkranz et al. | 264/25 |
| 3,894,835 | 7/1975 | Berggren et al. | 432/11 |

FOREIGN PATENTS OR APPLICATIONS 1,315,205  5/1973  United Kingdom

OTHER PUBLICATIONS

Injection Molding Theory and Practice, I. Rubin, pp. 264–267, 1973, Wiley & Sons, N.Y., N.Y.

*Primary Examiner*—Jeffery R. Thurlow
*Attorney, Agent, or Firm*—Eugene Zagarella, Jr.

[57] ABSTRACT

Hollow articles such as bottles and containers are formed from tubular, elongated injection molded preforms made of thermoplastic material and having a finished neck portion adjacent an open end and a closed end body portion which method comprises annealing said preform by heating the portion of the preform body adjacent the neck to a temperature just below or about the Tg (glass transition temperature) for such material while maintaining the remainder of the preform body at a significantly lower temperature, for a sufficient time to essentially relieve the internal stresses in said body portion adjacent the neck, such annealing step being applied prior to the thermoforming of said preform into the hollow article.

12 Claims, 1 Drawing Figure

U.S. Patent
May 24, 1977
4,025,594
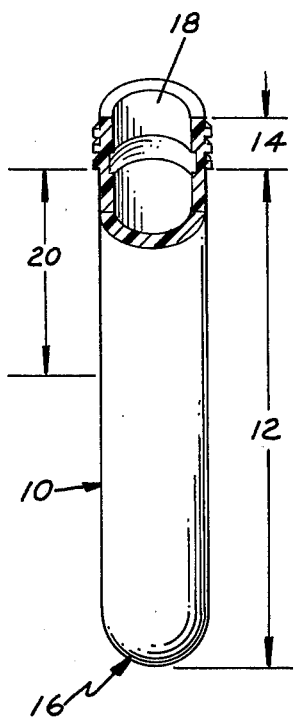

METHOD FOR PRODUCTION OF HOLLOW ARTICLES FROM INJECTION MOLDED PREFORMS

BACKGROUND OF THE INVENTION

The invention relates to an improved method for forming hollow articles from injection molded thermoplastic preforms by subjecting selected portions of said preform to an annealing step prior to thermoforming into said hollow article.

It is known to thermoform molded elongated, tubular thermoplastic preforms into hollow articles such as bottles and containers. One particularly desirable method for producing the preforms that are used is by injection molding since such method allows for the high production of parts having very uniform dimensions and weight distribution. However, one problem which has resulted when using injection molded preforms is that upon heating said preforms to thermoforming temperature, significant lean (bending) and shrinkage occurs. This lean causes the thermoformed articles prepared from such preforms to have an undesirable variation in wall thickness and oftentimes the minimum acceptable limits will not be satisfied. This problem was not completely unexpected since injection molded parts are known to possess internal residual stresses due to the nature of the process, the equipment design and the geometry of the molded part itself (note "Injection Molding, Theory and Practice" by Irvin I. Rubin, Chapter 3, 1972). However, despite the careful control and selection of process conditions and equipment design, the problem did not lend itself to an easy solution.

It is known that built in stresses can be relieved to some extent by annealing as disclosed in Rubin cited above. However, it was found that annealing of the entire elongated preform body did not give a satisfactory solution since significant lean still resulted upon heat up of the part.

SUMMARY OF THE INVENTION

Now, in accordance with this invention, there has been developed an improved method for forming hollow thermoplastic articles from injection molded preforms.

Accordingly, a principal object of this invention is to provide a method for thermoforming tubular, elongated thermoplastic injection molded preforms into hollow articles by subjecting said preforms to a selective annealing process prior to the forming operation.

Another object is to provide hollow, thermoplastic articles having reduced wall thickness variation by thermoforming injection molded preforms which have been initially subject to a special annealing method.

A further object is to prepare hollow articles such as bottles and containers made of high nitrile polymer by subjecting preforms made of such materials to a selected annealing process prior to thermoforming into said articles.

Other objects of this invention will in part be obvious and will in part appear hereinafter.

These and other objects are accomplished by providing a method for the production of a hollow article by thermoforming a tubular, elongated injection molded preform made of thermoplastic material and having a finished neck portion adjacent an open end and a closed end body portion, said preform having been annealed prior to thermoforming by heating the portion of said preform body adjacent the neck to a temperature which is just below or about the Tg (glass transition temperature) for such material while maintaining the remainder of the preform body at a significantly lower temperature for a sufficient time to essentially relieve any internal stresses in said body portion adjacent the neck.

BRIEF DESCRIPTION OF THE DRAWING

In describing the overall invention, reference will be made to the accompanying drawing which is a perspective view with a portion broken away of a typical injection molded preform shape for use in the present invention.

DETAILED DESCRIPTION OF THE INVENTION

In carrying out the method of this invention, a tubular, elongated injection molded preform made of thermoplastic material and having a general configuration of the type shown in the drawing is annealed in selected portions by heating to a temperature just below or about the glass transition temperature (Tg) i.e. that temperature or narrow temperature range below which the material is in a glassy state, for such material while maintaining the remainder of the preform body at a significantly lower temperature, prior to thermoforming said preform into a hollow article.

The drawing illustrates a typical tubular, elongated preform 10 formed by injecting molding a thermoplastic material and used to prepare hollow articles such as bottles and containers in accordance with the method of the invention. Preform 10 comprises a body portion 12 and a finish or neck portion 14 and has an open end 18 and a closed end 16. Generally designated as 20 is that portion of the preform body found adjacent the neck and which is subject to the annealing step described herein. Though the wall thickness and the weight of the preform 10 may vary widely, it generally has relatively thick walls along body 12 typically ranging from about 70 to about 300 mils, and typically weighing from about 15 to about 125 grams. The preform body length also may vary widely and typically ranges from about 3 to about 12 inches. The preforms are formed by injecting molding in a conventional manner as for example disclosed in the book by Rubin, cited above. A typical preform of this nature is shown in further detail in Sincock, U.S. Pat. No. 3,900,120 issued Aug. 19, 1975.

Prior to thermoforming the thermoplastic preforms into hollow articles, it has been found that by selective annealing said preforms, the variation in the wall dimensions of the prepared articles can be reduced and the inline quality yield improved. This is accomplished by heating the portion of the preform body adjacent the neck to a temperature which is just below or about the glass transition temperature (Tg) for the material. The portion of the preform body adjacent the neck is shown generally as 20 in the drawing and may constitute up to about 40% of the total length of the preform body and preferably up to about 25% of the total preform body length.

The body portion adjacent the neck is annealed by heating said portion to a temperature just below or about the Tg for the material used and more particularly to a temperature of from about 50° F below Tg up to about Tg. The remainder of the preform body is maintained at a temperature significantly below Tg and generally may vary from about ambient temperture to about 55° F below Tg, preferably from about ambient temperature to about 100° F below Tg and more preferably at about ambient temperature. The time at which the preform body is maintained at the annealing temperature may vary widely depending on the particular temperature to which the body portion adjacent the neck is heated. It is necessary that this time be sufficient to essentially relieve the internal stresses which reside in the body portion adjacent the neck. The term "essentially relieve the internal stresses" as used throughout the specification and claims means the elimination, reduction and/or balancing of stresses found in the previously fabricated injection molded preform. The closer the temperature at which the preform body temperature adjacent the neck is to Tg, the shorter will be the annealing time and this may vary from a matter of a few seconds up to several hours or more.

Any thermoplastic material which may be injection molded into a preform and subsequently thermoformed into a hollow article may be used in the method of this invention including those based on polymers such as styrene, nitrile polymers e.g. acrylonitrile and methacrylonitrile, ethylene, propylene and olefins such as isobutylene, acrylates, polyesters such as polyethylene terephathate and a variety of others such as disclosed in Modern Plastics Encyclopedia, October 1974, Vol. 51, No. 10A, pp. 542–564. One particularly preferred material of this type is nitrile polymers containing from about 55 to about 85% by weight of a nitrile monomer unit, based on the total polymer weight, wherein the weight percent of nitrile monomer is calculated as acrylonitrile. The nitrile monomers include acrylonitrile, methacrylonitrile, ethacrylontrile, propacrylonitrile, glutaronitrile, methylene glutaronitrile, fumaronitrile as well as mixtures of these monomers. The preferred monomers which are interpolymerized with the nitrile monomers include aromatic monomers such as styrene and alpha methyl styrene; lower alpha olefins containing 2 to 6 carbon atoms such as ethylene, propylene, butylene, isobutylene, etc; acrylic acid and methacrylic acid and the corresponding acrylate and methacrylate esters containing 1 to 4 carbon atoms such as methyl acrylate, ethyl acrylate, propyl acrylate and the corresponding methacrylates; vinyl esters such as vinyl acetate; vinyl ethers wherein the alkyl group contains 1 to 4 carbon atoms such as methyl vinyl ether, ethyl vinyl ether etc; and mixtures thereof.

Optionally impact modifying materials such as a synthetic or natural rubber component e.g. polybutadiene, isoprene, neoprene, nitrile rubbers, acrylate rubbers, natural rubbers, acrylonitrile-butadiene copolymers, ethylene-propylene copolymers, chlorinated rubbers, etc. may be used to strength or toughen the high nitrile materials. Generally the amounts of such rubber component will vary from 0 to about 25% by weight based on the total polymer weight.

The particularly preferred nitrile polymers useful as the article material are those containing from about 55 to 85% by weight, based on the total polymer weight, of an acrylonitrile and/or methacrylonitrile monomer (wherein the weight percent of methacrylontrile is calculated as acrylonitrile). When acrylonitrile is used as the sole nitrile monomer the preferred range is from about 60 to about 83% by weight whereas with methacrylonitrile the preferred range is from about 70 to about 98% by weight of methacrylonitrile which corresponds to about 55 to about 75% by weight of nitrile monomer calculated as acrylonitrile. The preferred commonomers are styrene and alpha methyl styrene. Also preferred are interpolymers such as acrylonitrile/methacrylonitrile styrene; acrylonitrile/styrene/methyl vinyl ether and acrylonitrile/styrene/ethyl vinyl ether.

The annealing of the preforms in accordance with the method of this invention may be carried out by passing said preforms through a heating oven containing external heating means such as radiant heaters. Generally this may be done by placing the preforms, neck portion 14 down in holders located on a conveyor. The neck portion is masked by the holder or in some other manner as it passes through the oven so that only the body portion 12 or the selected portion thereof is exposed to the heating means. The neck portion 14 has been accurately finished and formed to close tolerances and is not intended to be further modified or altered at this time. Heating of the body portion may be carried out by masking portions other than those found adjacent the neck 20 or by having banks or rows of heaters operating at different temperatures as selected. To get more uniform heat distribution on the outside surface of the preform body, they may be rotated in a conventional manner if desired. As will be readily apparent to those skilled in the art, other conventional heating means may be used to bring the selected preform body portions to the desired temperatures. For example, Rosenkranz et al, U.S. Pat. No. 3,865,912 issued Feb. 11, 1975, discloses a heating chamber having a plurality of infrared heaters plus other means arranged to heat different portions of the part to different temperatures. Additionally, it is to be noted that depending on the particular means used to apply heat and because of the relatively low thermal conductivity of the type of materials being used, a temperature gradient through the preform will generally exist. This is not particularly detrimental provided the temperatures are within the ranges noted previously. A more uniform temperature distribution can of course be provided by controlling or varying the elements causing such differences. Temperature measuring means may be provided to measure the outside preform temperatures after it leaves the oven or heating area and such information can be used to adjust and control the conditions so that the desired temperature can be reached.

Following annealing, the preform may then be cooled and stored for further use or passed directly on to the thermoforming operation. The term "thermoforming" as used in the specification and claims is intended to include all types of molding including blow molding as well as those involving molecular orientation by axially stretching and radially expanding the preform while at the orientation temperature. A variety of hollow shaped articles such as bottles and other types of containers may be produced by this method.

Various modifications and alterations of the invention will be readily suggested to persons skilled in the art. The following example is given to illustrate the principles and practice of this invention and should not be construed as limitations thereof.

EXAMPLE

A series of 70 gram injection molded preforms obtained using standard injection molding equipment, shaped as illustrated in the drawing and made of a polymer comprising a 70/30 mixture by weight of polymerized acrylonitrile/styrene monomer (Tg about 240°

F) and having wall thickness of about 190 mils and a total body length of 7 inches (i.e. not including the neck portion) were inserted in holders mounted on a conveyor and passed through a heating oven which contained two banks of infrared heaters on opposite sides. Each bank of heaters was 35 inches long and consisted of eight horizontal heater strips, each 1 inch wide with the bottom three strips positioned so as to be opposite the portion adjacent the neck of the preform body and at a temperature of about 800° F and the upper heaters operating at a temperature of about 300° F. The ambient oven temperature was measured at 155° to 165° F and the preforms were conveyed through said oven during a period of 2.7 minutes. The temperatures of the preforms were monitored at its outside surface using a Williamson infrared recording instrument as it left the oven with temperatures at one inch intervals along the preform body, starting with the portion immediately adjacent the neck varying as follows: 225°, 220°, 190°, 165°, 154° and 145° F (note the temperature at top of closed end portion of the preform was not measured).

The annealed preforms were then subject to a heating operation wherein the entire preform was heated to orientation temperature of about 270° F. Following this, lean measurements made at the top of preform (i.e. about 0.5 inches below closed end) were made on the preforms using an Epic-30, Optical Comparator and Measuring Machine manufactured by Jones and Lamson. Measurements showed an average lean of 0.375 inches. For comparison purposes, a series of identical preforms not subject to the annealing operation but heated up to orientation temperature were measured for lean and the measurements show an average lean of 0.530 inches. This showed that the preforms subjected to the annealing operation of this invention resulted in a reduction in lean of about 30%. Other series of preforms showed reductions of lean varying from about 20 to 40%.

Bottles were thermoformed from said annealed preforms by axially stretching and radially expanding while at orientation temperature. A significant increase in yield of bottles within the acceptable minimum maximum wall thickness variation over the unannealed counterparts resulted, indicating a general reduction in wall thickness variation for bottles prepared from annealed preforms.

What is claimed is:

1. In the method for the production of a hollow article by thermoforming a tubular, elongated injection molded preform made of thermoplastic material selected from the group consisting of styrene polymers, nitrile polymers, olefin polymers, acrylate polymers and polyester polymers and having a finished neck portion adjacent an open end and a closed end body portion the improvement comprising annealing said preform prior to thermoforming into said article by heating the portion of said preform body adjacent the neck which portion comprises up to about 40% of the total length of the preform body to a temperature of from about 50° F below Tg up to about Tg of such material while maintaining the remainder of the preform body at a temperature of from about ambient temperature to about 55° F below Tg for such material for a sufficient time to essentially relieve the internal stresses in said body portion adjacent the neck.

2. The method of claim 1 wherein said thermoplastic material is a nitrile polymer containing from about 55 to 85% by weight of nitrile monomer units based on the total polymer weight.

3. The method of claim 2 wherein the material polymer is acrylonitrile.

4. The method of claim 3 wherein said acrylonitrile polymer contains a styrene comonomer.

5. The method of claim 1 wherein the portion of the preform body adjacent the neck represents up to about 25% of the total length of the preform body.

6. The method of claim 5 wherein the said portion of the preform body adjacent the neck is heated to a temperature of from about 25° F below Tg up to about Tg.

7. The method of claim 6 wherein said thermoplastic material is a nitrile polymer containing from about 55 to 85% by weight of nitrile monomer units based on the total polymer weight.

8. The method of claim 7 wherein the nitrile polymer is acrylonitrile.

9. The method of claim 8 wherein said acrylonitrile polymer contains a styrene comonomer.

10. The method of claim 9 wherein said hollow article is a bottle.

11. The method of claim 10 wherein said remainder of the preform body is maintained at a temperature of from about ambient temperature to about 100° F below Tg.

12. The method of claim 11 wherein said thermoforming step is carried out by axially stretching and radially expanding the preform while at orientation temperature.

* * * * *